United States Patent [19]

Foulard

[11] Patent Number: 5,141,208
[45] Date of Patent: Aug. 25, 1992

[54] FOUNDRY PLANT WITH ROTARY FURNACES AND PROCESS OF OPERATION

[75] Inventor: Jean Foulard, Ablon, France

[73] Assignee: L'Air Liquid, Societe Anonyme pour l'Etude et l'Exploitation des Procedes Georges Claude, Paris, France

[21] Appl. No.: 757,203

[22] Filed: Sep. 10, 1991

[30] Foreign Application Priority Data

Sep. 13, 1990 [FR] France .................. 90 11327

[51] Int. Cl.⁵ ............................................ C21B 11/06
[52] U.S. Cl. ................................... 266/173; 75/708
[58] Field of Search ..................... 266/173; 75/708

[56] References Cited

U.S. PATENT DOCUMENTS 3,030,094 4/1962 Saeman ..................... 266/173
3,180,631 4/1965 Moklebust ................. 266/173

Primary Examiner—Peter D. Rosenberg
Attorney, Agent, or Firm—Young & Thompson

[57] ABSTRACT

The process comprises the steps of mounting two rotary furnaces in series including a smelting station and a charge preheating station, effecting a smelting in the furnace at the smelting station while causing the fumes from the first furnace to pass through the furnace at the preheating station towards an exhaust chimney to preheat the charge in the preheating furnace, and transferring the furnace which is at the smelting station towards a casting station. To enable the various transfers of furnaces each furnace is associated with a transfer support including a device for causing rotation of the furnace.

8 Claims, 3 Drawing Sheets

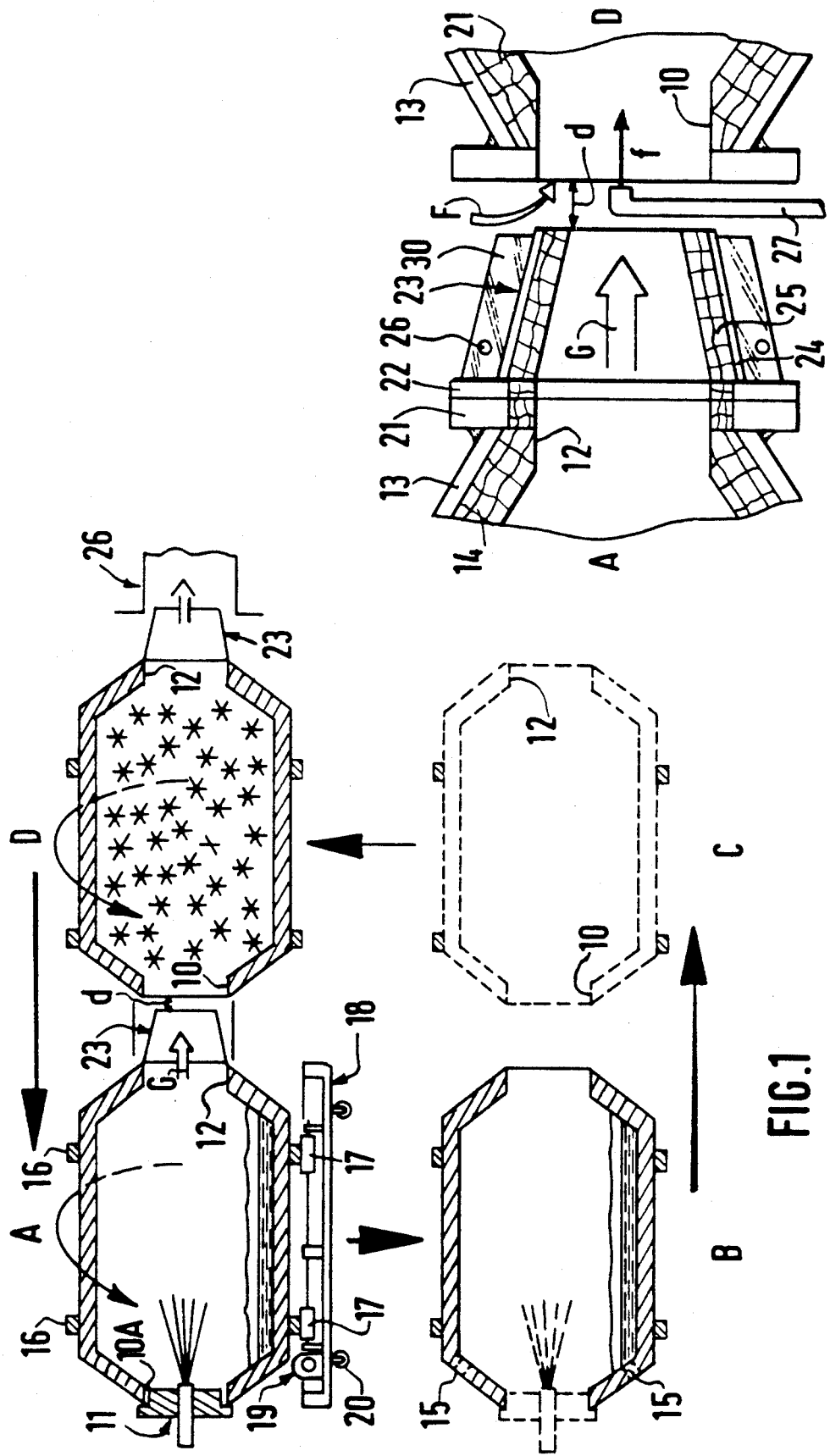

FOUNDRY PLANT WITH ROTARY FURNACES AND PROCESS OF OPERATION

BACKGROUND OF INVENTION (a) Field of the Invention

The present invention concerns devices for smelting metals with rotary furnaces, and more particularly a process for utilizing at least a smelting line including at least one rotary furnace with oxy-combustible burner, and comprising the steps of loading the furnaces with pieces of metal to be molten, smelting the metal and casting the molten metal.

(b) Description of Prior Art

Rotary furnaces with oxy-combustible burners have been increasingly successful, such as in small smelting plants, because they have been found to be flexible in performing and produce a limited amount of fumes.

In the known devices, the rotary furnace is disposed as a single station in the vicinity of the chimney, to which it is connected by means of a movable connection enabling to tilt the furnace during the loading step. Once the loading has been carried out, the oxy-combustible burner is operated to carry out the smelting step, which for a load of metal to be smelted of the order of 3 tons, lasts about 1 hour and 30 minutes, with a first step, of about one hour, where the burner burns a stoichiometric mixture of fuel and oxygen, then, in order to limit the oxidation of the metal during the smelting operation, a second step, of a duration of about 30 minutes, is provided with a mixture depleted in oxygen. During this second step, the fumes which are withdrawn through the chimney contain, in addition to carbon dioxide and water vapor, carbon moxoxide and hydrogen, which, combined with the demand of draft air in the chimney, frequently induces the formation of flames in the chimney which could severely damage the latter and prevents an efficient cleaning of the fumes.

SUMMARY OF THE INVENTION

It is an object of the present invention to propose a process for the operation of a smelting line with rotary furnace enabling to substantially increase the global yield of operation, to reduce the emissions of dust, at the start of the operations, carbon monoxide and hydrogen, to limit the losses by fire in the smelting furnace and to facilitate the cleaning of the exhaust fumes.

For this purpose, according to a characteristic of the invention, the process utilizes at least two rotary furnaces and comprises the following steps:

(a) mounting a first loaded furnace in a first station, (b) mounting a second loaded furnace in a second station, (c) effecting a smelting in the first furnace at the first station, (d) during step c), causing the fumes of the first furnace to pass through the second furnace at the second station towards an exhaust chimney in order to preheat the metal in the second furnace, (e) once smelting has been carried out, transferring the first furnace towards a casting station, and (f) effecting a smelting of the charge in the thus preheated second furnace.

According to a more specific characteristic, the process comprises the further step of, (g) after casting, transferring the first furnace towards a third station to reload with metallic articles waiting to be transferred to a further step of preheating or smelting.

It is another object of the present invention to provide a smelting device enabling to carry out the above process, of the type comprising at least one rotary furnace with oxy-combustible burner and a chimney for exhausting fumes, including at least two rotary furnaces which are each movable between different stations, including at least one smelting station and one preheating station disposed in line with the chimney so that the fumes from the furnace at the smelting station is exhausted toward the chimney through the furnace at the preheating station, and a casting station away from the line of the smelting and preheating stations.

The provisions according to the invention, utilizing a preheating of the loads before smelting have numerous advantages:

first, the recovery of the heat, otherwise lost, in the exhaust fumes enables to bring the charge to be molten, at a high temperature and to preheat the furnace itself, so that the smelting step requires a reduced energy input which represents a reduction of the time cycle and a decrease of the consumption of heating gas;

the preheating being carried out in the furnace which then will ensure the smelting step, the risks of sticking together of the articles to be smelted present no problem contrary to what would take place if these articles would have been preheated, by other means, before loading into the furnace; this solution permits a maximum recovery of energy without particular technological restraints;

the problems associated with the flammability of the fumes, instead of taking place in the chimney, are here brought back in the preheating furnace and are even, according to a characteristic of the invention, favored, to produce a combustion of carbon monoxide directly in the preheating furnace, thereby increasing the temperature of the latter, and supplying to the chimney cooler fumes and of globally reduced volume, without any risk of damaging the chimney, thereby largely facilitating the cleaning of the fumes;

the combustion of carbon monoxide in the heating furnace enables to use in the less oxidizing adjustment in the smelting furnace thus limiting the losses by fire without increasing the cost of smelting, which enables to still reduce the energy consumption of the apparatus;

with at least two rotary furnaces, and, advantageously, three furnaces, the operations of casting and loading are carried out in a negligible time period as compared to the operations of smelting/preheating, which enables to largely increase the rhythm of production of the device.

BRIEF DESCRIPTION OF THE DRAWINGS

Other characteristics and advantages of the present invention will appear from the description which follows of the embodiments, given by way of illustration but without limitation, with reference to the annexed drawings, in which:

FIG. 1 is a schematic illustration of the general arrangement of a unit comprising a single smelting line to carry out the process according to the invention;

FIG. 2 is a schematic view, in partial cross-section, of the junction zone between the outlet of the furnace at the smelting station and the inlet of the furnace at the preheating station;

DETAILED DESCRIPTION OF THE INVENTION

Figure 3:
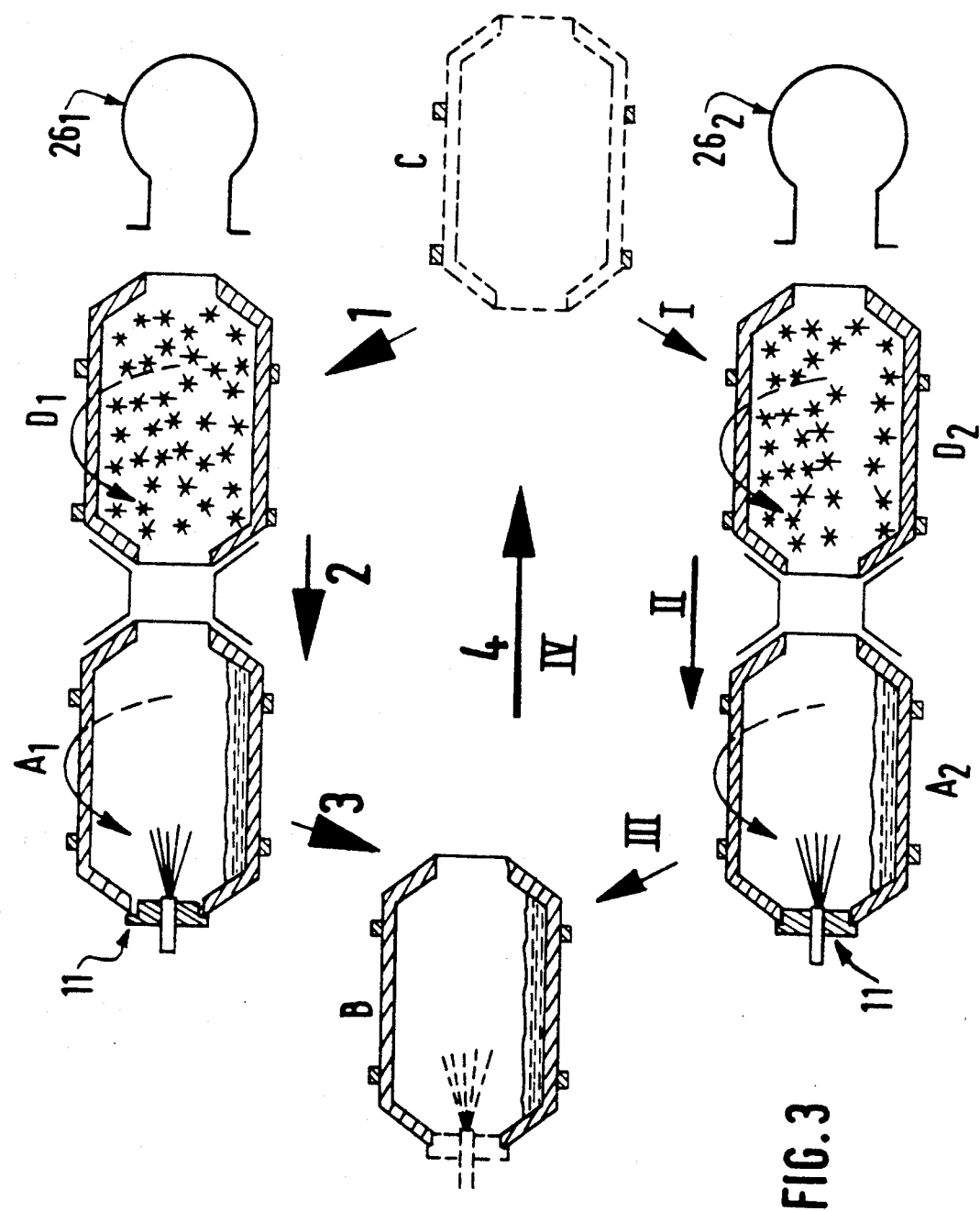
FIG. 3 is a schematic illustration showing the general arrangement of a smelting unit comprising two smelting lines.

In the description which follows and in the drawings, identical or analogous items are referred to by the same reference numerals, possibly indexed.

In FIG. 1, there is illustrated a device for smelting using one single smelting line and arranged with four distinct stations, namely a smelting station A, a station for casting molten metal B, a station for loading the furnace C and a station for preheating the load to be smelted D.

The device represented comprises three identical rotary furnaces, each having a general tubular shape, partially closed at its ends to allow two central co-axial openings or tap holes, an inlet opening 10 to removably receive, an oxy-combustible burner 11, for example of the type described in French Patent Application No. 89.09694 in the name of the Applicant, and an outlet opening 12 for the evacuation of the fumes and for loading metallic articles to be smelted at the loading station. Each furnace includes a metallic frame 13 and an inner lining 14 of refractory bricks. The truncated end part defining the opening 10 for the burner 11 includes two tapping holes 15 which are diametrically opposite and normally closed by means of a plug except during the casting operation. The frame 13 is peripherally provided with two cylindrical arcs 16 cooperating with rotary driving rollers 17.

According to a feature of the invention, each furnace is intended to be transferred to at least three distinct stations, each furnace is associated with a transfer support 18 including roller 17 and a motor 19 for a driving roller 17. The support 18 is provided with means enabling the handling and the transfer of the furnace/support assembly, for example hooks for a displacement by means a hoister, or preferably double flange wheels 20 to move the assembly on rails including suitable switchings and rotary plates (not illustrated).

According to another feature of the invention, the frame 13 of each furnace includes, at its end defining the outlet opening 12, a flange 21 enabling the mounting, by means of a flange 22, of a gas guiding element 23, itself made of a an external metallic frame 24, advantageously provided with cooling wings 30 and an internal refractory lining 25, and advantageously converging towards the outside. The element 23 comprises devices, such as orifices 26, for handling same.

As well illustrated at FIG. 1, according to the process of the invention, a loaded furnace, at station C, with metallic articles to be smelted, represented by means of stars, is disposed between a furnace mounted at station A for a smelting step, and chimney 26. The furnace at station D is already advantageously provided with the guiding element 23 extending its outlet opening 12 so as to create, at the inlet of the chimney, a suction effect with demand for air to cool and dilute the fumes to be evacuated. The furnace at station A, also provided with a connecting device 23, is axially positioned with respect to the furnace at station D so as to leave a play d between the end of the connecting element 23 and the inlet of the opening 10 of the furnace at station D. As described above, by effecting the smelting in the furnace at station D, the fumes, evacuated by natural draft in chimney 26 or by means of a slight overpressure of the furnace at station A, pass through the charge in the furnace at station D which is rotatably operated as the furnace at station A, and which produces a substantial uniform temperature rise, of the charge and of the refractory lining of the furnace at station D. At the level of the interface between the furnaces, as is well illustrated in FIG. 2, the flow of fumes G produced in the furnace at station A is accelerated in the connection element 23 and produces, at the inlet opening 10 of the furnace at station D, an air draft, illustrated by arrow F, to promote the combustion of carbon monoxide in the preheating furnace at station D. Advantageously, at least during the second smelting phase, with sub-stoichiometric adjustment of the combustion in the furnace at station A, a pipe for injecting oxygen 27 is introduced to space d to inject into the furnace at station D a flow f of oxygen to complete the combustion and the reduction of hydrogen in the furnace at station D. As a variant, to accelerate the flow of gas through the furnace at station D and raise the temperature therein, the oxygen pipe may be replaced by an oxy-combustible burner pipe feeding into the furnace at station D.

Once the smelting has been carried out at station A, the furnace containing the molten metal is transferred to the casting station B where the metal is removed through the casting opening 15, or where the molten metal is put on hold before casting. During this step, the furnace at station D may temporarily be placed on hold or the smelting step may be carried out immediately. Once the casting has been terminated at station B, the furnace is brought to the loading station C where it is tilted to remove the residual slag through the opening 12, and a second time; to receive a new load through the same opening 12. Once loaded, the furnace at station C is brought to station D to operate in pair with a furnace effecting an operation of smelting at station A and having previously been preheated at station D.

As seen in FIG. 3, a device utilizing two smelting lines (indicated by reference numerals 1 and 2) enables to optimize the mounting on the ground since the stations of casting B and loading C may by made common to the two lines operating according to cycles which are out of phase with the duration of a casting operation and/or loading operation depending on the number of furnaces used.

Figure 4:
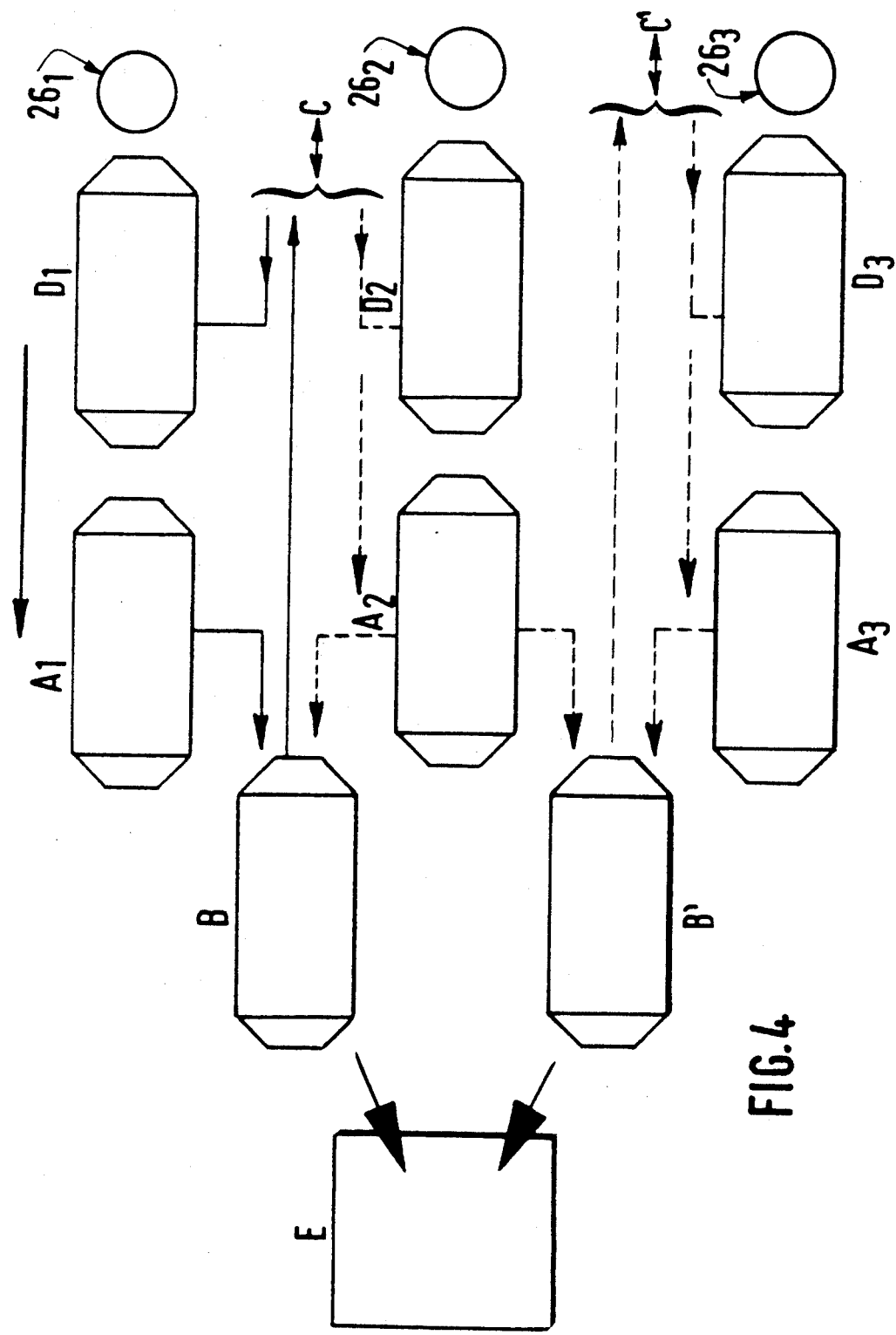
FIG. 4 illustrates the arrangement of a unit with three smelting lines and the possible cycles of different furnaces for carrying out the process according to the invention.

In FIG. 4, there are illustrated the transfer flows of the rotary furnaces in a device with at least three lines of smelting, represented by reference numerals 1, 2 and 3, sharing in pair a loading station C, C', and a casting station B, B'. The latter may in addition be associated with a station for holding the temperature E, where a definite standardization of the molten metal may be carried out.

In this connection, it will be noted that by providing, including in a device with one single smelting line, a holding station or a station for keeping beside the casting station, castings representing more than the capacity of one single furnace may be carried out, the time of a smelting step according to the process of the invention being considerably reduced.

Although the present invention has been described with respect to specific embodiments, it is not limited thereby but, on the contrary, modifications and variants are possible as would appear to one skilled in the art.

We claim:

1. A method of operating at least one smelting line for smelting charge materials including at least two rotary furnaces equipped with burners, comprising the steps of:
   a) providing a first station and a second station adjacent one to each other, and at least a separate third station;
   b) placing a first furnace loaded with a charge at the first station and a second furnace loaded with a charge at the second station;
   c) smelting the charge in the first furnace at the first station while passing fumes from the first furnace through the second furnace at the second station towards exhausting means so as to preheat the charge in the second furnace;
   d) moving the first furnace with its smelted charge from the first station to the third station for further processing;
   e) moving the second furnace with its preheated charge from the second station to the first station;
   f) smelting the charge in the second furnace at the first station.

2. The method of claim 1, further comprising the steps of:
   g) providing a fourth station;
   h) casting the smelted charge from the first furnace at the third station and moving the first furnace from the third station to the fourth station for loading with a new charge to be smelted.

3. The method of claim 1, further comprising the step of introducing a gas containing oxygen in the second furnace at the second station during at least a part of step c).

4. The method of claim 3, wherein, during step c), the burner of the first furnace at the first station is fed with a combusting mixture including a reduced amount of oxygen.

5. The method of claim 2, wherein a third rotary furnace is operated, comprising the step of:
   i) during the step c), placing the third furnace at the fourth station and loading it with a charge to be smelted.

6. The method of claim 5, further comprising the step of:
   j) moving the loaded third furnace to the second station after step a) and conducting step f) as a new step c).

7. The method of claim 1, wherein each furnace is provided with a displaceable transfer bed having integrated means for rotating the furnace.

8. The method of claim 1, comprising the step of placing, during step c), a releasable fumes guiding member between the first furnace and the second furnace.

* * * * *